Patented Sept. 11, 1934

1,973,558

UNITED STATES PATENT OFFICE 1,973,558

FLOTATION METHOD

Frederic A. Brinker, Denver, Colo.

No Drawing. Application December 15, 1931,
Serial No. 581,269

11 Claims. (Cl. 209—167)

This invention relates to improvements in methods of flotation ore separation.

Ores containing a plurality of metal sulfides such as lead, copper, zinc and iron sulfides mixed with gangue have been separated by the flotation method because the lead and the copper sulfides can be floated in greater proportion or have greater flotability than the zinc and iron sulfides and therefore by employing a differential flotation method, it has been possible to procure a separation of the lead and copper sulfide from the iron and zinc sulfides. The zinc sulfide will usually then be later separated from the iron sulfides. It is to this separation and a method of attaining it that this invention relates.

The flotation of minerals depends on the character of their outer surfaces and it has been found that sulfides adhere to the air bubbles better than any other materials and each sulfide has a certain flotability, which flotability can be altered by altering the surface of the sulfide.

I have found that if the ore is ground in water many of the soluble constituents, such as the sulfates, will go into solution and unless precautions are taken the sulfates, such as copper sulfate will react with the zinc and the iron sulfides with the result that the outer surfaces of the latter will get a coating of a copper compound which is very active and therefore when the resulting pulp is subjected to flotation, the zinc and the iron sulfides will float as well as the copper and/or the lead sulfides.

It is the object of this invention to grind the ore in water; to subject the ground ore pulp to the action of an oxidizing agent, such as air or sulphur dioxide and air for the purpose of oxidizing the outer surfaces of the zinc and iron sulfide particles to inhibit them from flotation and to subject the ore to such treatment that the soluble constituents can be removed, after which the ore is repulped and subjected to flotation treatment whereby the copper and/or lead sulfides will be separated from the zinc and the iron sulfides, the latter only passing over in very small quantities on some ores. It may be advisable on some ores to separate this small quantity of zinc and iron sulfide from the copper and/or lead sulfides in the cleaning cell by adding a cyanide solution which will combine with the coating on the zinc and the iron sulfides and inhibit them from floating.

In order to more clearly explain the process, a case will be assumed in which an ore containing lead sulfide, copper sulfide, zinc sulfide, iron sulfide and gangue is to be treated.

The ore is first ground in water, after which it is conditioned for a suitable period to increase the soluble constituents. The conditioning is effected by subjecting the pulp to the action of air alone or in combination with sulphur dioxide or any other suitable oxidizing agent. The oxygen changes the sulfides to sulfates which are soluble and which, therefore, go into solution, and this inhibits the zinc and the iron from floating.

After the ore has been conditioned, the soluble matter which is mostly soluble sulfates, is removed either by filtering, or by adding barium hydroxide or barium carbonate which precipitates the sulfates as insoluble sulfates or by using other means which removes these soluble materials.

After the removal of the soluble material, the ore is repulped and subjected to flotation treatment, whereby the copper and/or the lead sulfides plus a small percentage of the iron and zinc sulfides, which have been slightly activated are carried over with the froth. It may be advisable with the froth on some ores to separate the copper sulfide from the small amount of iron and zinc sulfides or the lead sulfide from the small amount of iron and zinc sulfide, this froth is mixed with a cyanide solution which removes the sulfide coating from the zinc and the iron sulfides and inhibits them so that they will be rejected and pass into the tailings, while the lead and copper subjected to another flotation operation pass over with the froth. The zinc sulfide is then separated from the iron sulfide and gangue by the usual methods. This invention, therefore, comprises (1) grinding the ore in water; (2) conditioning the ore pulp by subjecting it to the action of an oxidizing agent such as air or sulphur dioxide whereby the surfaces of the sulfides are changed; the soluble sulfates then go into solution which can be removed by filtration or other means; (3) removing the soluble constituents of the pulp; (4) repulping and subjecting to differential flotation whereby one sulfide is floated in presence of another inhibited sulfide; and an optional step of adding a small amount of cyanide to the froth from the first flotation operation and subjecting it to another flotation treatment whereby the small amounts of iron and zinc or other sulfides are inhibited and remain in the tailings.

Attention is called to the fact that the cyanide is added to the froth from the first flotation operation only, instead of to the entire pulp and therefore the quantity of cyanide is very small in comparison.

Although this invention has been described using, for example, lead, copper, zinc and iron sulfides, it works equally well on other sulfide ores containing iron sulfide in which a differential separation is desired between a sulfide mineral and the iron sulfide; when barium compounds are added for the purpose of removing the soluble constituents filtration is not necessary.

Having described the invention what is claimed as new is:

1. In the method of froth flotation ore separation the steps of grinding the ore in water, conditioning the ore pulp by subjecting it to the action of an oxygen containing gas whereby the soluble constituents are increased, removing the soluble constituents of the pulp, repulping and subjecting the resulting pulp to flotation separation treatment.

2. In the method of froth flotation separation of ores, the steps of, grinding the ore in water, subjecting the ground ore to the oxidizing action of an oxygen containing gas and sulphur dioxide, whereby the soluble constituents are increased, removing the soluble constituents of the pulp, repulping and subjecting the resulting pulp to flotation separation treatment.

3. In the method of froth flotation ore separation, the steps of grinding the ore in water, conditioning the pulp by subjecting it to the action of an oxidizing gas whereby the soluble constituents are increased removing the soluble constituents, adding a barium compound, and subjecting the pulp to a flotation separation treatment.

4. In the method of froth flotation separation of ore containing iron sulfide the steps of grinding the ore in water, subjecting the ore pulp to the action of a gaseous oxidizing agent whereby the soluble constituents are increased, removing the soluble constituents of the pulp, repulping and subjecting the resulting pulp to flotation separation treatment.

5. In the method of froth flotation separation of ores containing copper sulfide and iron sulfide, the steps of grinding the ore in water, subjecting the ore pulp to the action of an oxygen containing gas whereby the soluble constituents are increased, removing the soluble constituents of the pulp, repulping and subjecting the resulting pulp to flotation separation treatment.

6. In the method of froth flotation separation of ores containing copper sulfide and iron sulfide, the steps of grinding the ore in water, subjecting the ore pulp to the action of an oxygen containing gas whereby the soluble constituents are increased, adding a barium compound and subjecting the resulting pulp to flotation separation treatment.

7. In the method of froth flotation ore separation of ores containing copper, zinc and iron, the steps of grinding the ore in water, conditioning the pulp by subjecting it to the action of air and sulphur dioxide whereby the soluble constituents are increased, adding a barium compound, subjecting the pulp to a flotation separation treatment whereby a separation is effected between the active and the inhibited particles, adding a cyanide solution to the froth and subjecting the same to further flotation treatment.

8. In the method of froth flotation separation of ores containing copper sulfide and iron sulfide, the steps of grinding the ore in water, subjecting the ore pulp to the action of an oxygen contaning gas whereby the soluble constituents are increased, removing the soluble constituents of the pulp, repulping, subjecting the resulting pulp to flotation separation treatment whereby a separation is effected between the active and the inhibited particles, adding a cyanide solution to the froth and subjecting the same to further flotation treatment.

9. In the method of froth flotation ore separation of ores containing the sulfides of copper, iron and zinc, the steps of grinding the ore in water, conditioning the ore pulp by subjecting it to the action of an oxidizing gas whereby the soluble constituents of the pulp are increased, removing the soluble constituents of the pulp, repulping, subjecting the resulting pulp to flotation separation treatment, whereby a separation is effected between the active and the inhibited particles, adding a cyanide solution to the froth and subjecting the same to a further flotation treatment.

10. In the method of froth flotation separation of ore containing copper sulfide, zinc sulfide and iron sulfide the steps of, grinding the ore in water, subjecting the ore pulp to the action of air and sulphur dioxide whereby the soluble constituents are increased, removing the soluble constituents of the pulp, repulping, subjecting the resulting pulp to flotation separation treatment, whereby a separation is effected between the active and the inhibited particles, adding a cyanide solution to the froth and subjecting the same to a further flotation treatment.

11. In the method of froth flotation separation of ores containing copper sulfide zinc sulfide and iron sulfide the steps of, grinding the ore in water, subjecting the ground ore to the oxidizing action of an oxygen containing gas and sulphur dioxide, whereby the soluble constituents are increased, adding a barium compound, subjecting the resulting pulp to flotation separation treatment, whereby a separation is effected between the active and the inhibited particles, adding a cyanide solution to the froth and subjecting the same to a further flotation treatment.

FREDERIC A. BRINKER.